Sept. 15, 1942.  S. B. THOMAS ET AL  2,295,977
PROCESS FOR THE PREPARATION OF AN ALUMINUM CHLORIDE CATALYST
Filed Sept. 28, 1939
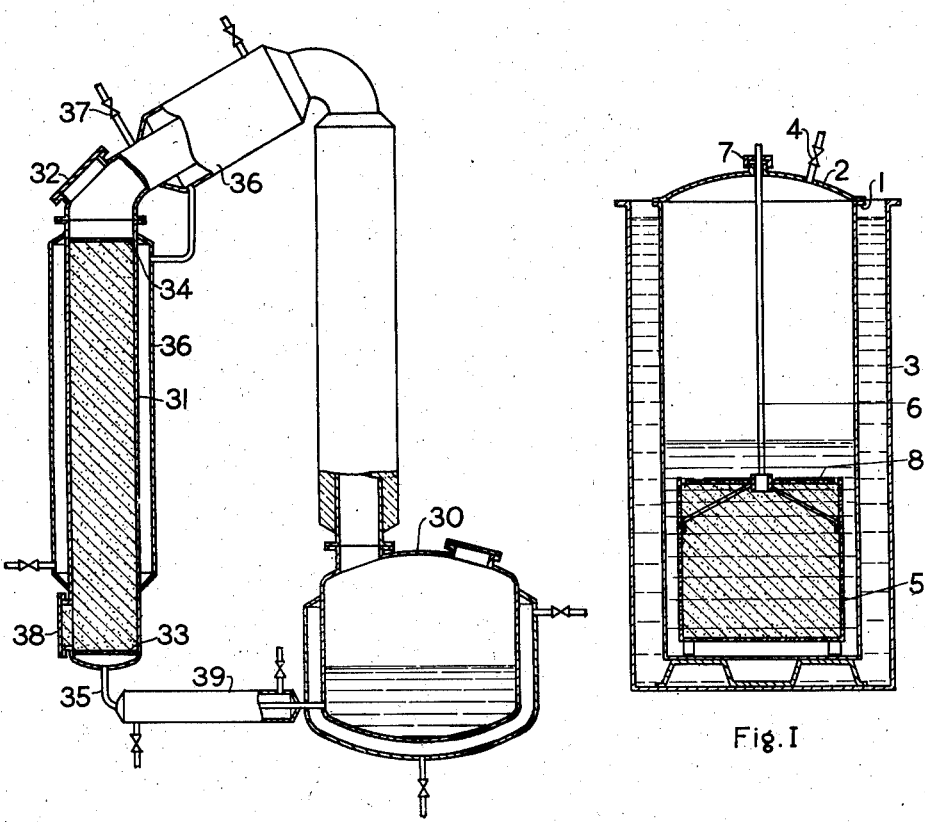
Fig. I
Fig. III
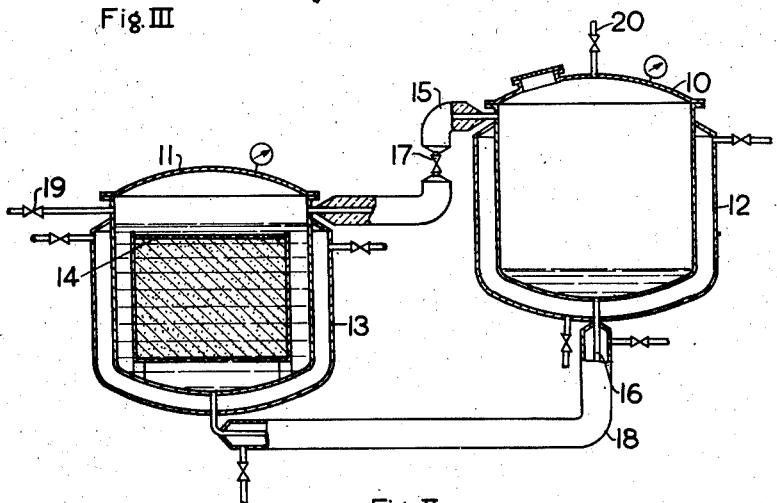
Fig. II
Inventors: Samuel Benson Thomas
Frank Matthew McMillan
By their Attorney:

Patented Sept. 15, 1942

2,295,977

UNITED STATES PATENT OFFICE 2,295,977

PROCESS FOR THE PREPARATION OF AN ALUMINUM CHLORIDE CATALYST

Samuel Benson Thomas and Frank Matthew McMillan, Berkeley, Calif., assignors to Shell Development Company, San Francisco, Calif., a corporation of Delaware Application September 28, 1939, Serial No. 296,898

4 Claims. (Cl. 252—205)

The present invention relates to new and improved catalysts comprising aluminum halides and to a process and apparatus for their preparation.

The aluminum halides constitute a well-known class of catalytic agents. These catalysts, especially aluminum chloride and aluminum bromide, are capable of catalyzing a large number of reactions and find considerable application in the alkylation of isoparaffins with olefins, the isomerization of saturated hydrocarbons, the polymerization of olefinic hydrocarbons, the cracking of hydrocarbons, the Friedel-Craft reactions, and the like. In many reactions using these catalysts, a large surface is not essential since the aluminum halides are soluble to a certain extent in many of the liquid reaction mixtures and in such cases they do not act entirely as heterogeneous catalysts. In most cases the aluminum halide is simply suspended in the reaction mixture, preferably with stirring. In a few cases, especially when executing the reaction in the vapor phase, the aluminum halide is employed in combination with carrier or supporting materials, such as pumice, activated charcoal, and the like. The function of the carrier material in these cases is primarily to prevent the aluminum halide from agglomerating to a hard lump in liquid phase processes and to produce a catalyst having a fixed physical shape better adapted for vapor phase reactions. These supported catalysts are usually prepared by simply mixing pieces of carrier material with the fine powdered anhydrous aluminum halide whereupon the surface of the carrier material becomes covered with the powdered aluminum halide. Another method for producing supported aluminum halide catalysts, which has the advantage of allowing the aluminum halide content to be varied over a wide range, is to press or mold suitable mixtures containing the desired amount of aluminum halide.

An object of the present invention is to provide new and improved promoted aluminum halide catalysts having exceptionally high catalytic activity. Another object of the invention is to provide aluminum halide catalysts which, when employed in vapor phase reactions at elevated temperatures, maintain their activity for long periods of time with exceptionally low loss of aluminum halide by volatilization. Still another object is to provide promoted aluminum halide catalysts having very high mechanical strength. Other objects of the invention are to provide methods and apparatus for the practical preparation of said catalysts.

It has recently been found that catalytic materials having superior properties are obtained by combining anhydrous aluminum halides, and especially aluminum chloride, with suitable carrier or supporting materials in a particular manner. These catalysts are described in copending application No. 290,256 filed August 15, 1939. According to the process of said copending application, a mixture of aluminum halide and a suitable catalyst carrier is heated while under superatmospheric pressure at a temperature sufficiently high to melt the aluminum halide, and the catalytic mass obtained upon cooling is broken up into fragments of the desired size. The catalysts prepared by this simple procedure are quite different than the supported catalysts prepared by the older methods and possess valuable and unexpected properties. One of the advantageous properties of these catalysts, is their increased catalytic activity. This increased activity is pronounced in some cases and less so in others and depends primarily upon the particular material with which the aluminum halide is combined. Since these catalysts are, in general, more active than catalysts of the same composition prepared by conventional methods, it is apparent that the increased activity is due to a promoting effect which is materially enhanced by the method of preparation.

We have now found that the promoting action of various carrier and supporting materials is further materially enhanced and that even more desirable catalysts are produced by combining the anhydrous aluminum halide and carrier material in still a different manner. According to the process of the present invention superior catalysts are prepared by soaking pieces of a suitable carrier material having the desired size, porosity, mechanical strength, etc., in a bath of molten anhydrous aluminum halide, draining off the excess aluminum halide and cooling, all while under superatmospheric pressure.

In order to prepare the present improved catalysts, apparatus embodying the principles of the apparatus illustrated in the attached drawing may advantageously be employed.

Figure I of the attached drawing shows a cross-section in elevation of one very simple type of suitable apparatus. Referring to Figure I, 1 is a pressure vessel provided with a removable cover 2 which is preferably provided with a valved connection 4. A basket or cage 5 having a removable top 8 is supported in the vessel by means of a shaft 6 passing through a packing gland 7 in the cover. The basket or cage is so adapted as to be adjustable vertically in the vessel while under pressure. The vessel and basket are so proportioned that when the basket is raised to its uppermost position, the vessel is capable of containing sufficient fused aluminum halide below the basket to completely cover the latter when the same, filled with pieces of carrier material, is lowered to its lowermost position (as shown).

In the claims the expression "a substantial excess of molten aluminum chloride" is to be read to mean a quantity of aluminum chloride in excess of that adsorbable in the carrier and sufficient to cover the carrier when it is immersed therein.

The preparation of the present catalysts using apparatus of this type is simple. A sufficient quantity of anhydrous aluminum halide (preferably aluminum chloride) is charged into the pressure vessel; the basket is filled with pieces of carrier material of the desired size and drawn up close to the cover; and the cover is secured. After introducing a gas to give an increased pressure, if desired, the apparatus is heated by any suitable means, such as by immersing in a hot oil bath 3. As soon as the aluminum halide is fused, or any time thereafter, the basket is forced down into the melt. After allowing the carrier material to remain in the molten aluminum halide for a few minutes or longer, the basket is raised to its uppermost position and the catalyst allowed to drain. When the excess aluminum halide has drained sufficiently from the catalyst particles, the apparatus is cooled, the pressure released, and the catalyst removed.

While apparatus such as illustrated in Figure I is quite suitable for the production of smaller quantities of catalyst, larger quantities are more conveniently and economically prepared in apparatus such as illustrated in Figures II and III.

The apparatus illustrated in Figure II comprises two pressure vessels 10 and 11 interconnected in their upper and lower portions by pipes 15 and 16. The vessels are provided with suitable heating and/or cooling means, such as jackets 12 and 13, for the circulation of suitable media. Vessel 11 is provided with a removable basket or cage 14 for the catalyst.

The solid anhydrous aluminum halide is charged to vessel 10 and the carrier material is charged into the basket 14 in vessel 11. The aluminum halide is fused by heating vessel 10 and the melt conveyed to vessel 11 via pipe 16. In order to keep the melt from freezing in vessel 11 and/or in pipe 16 during the impregnation and transfer, these may be heated by circulating a suitable heated medium through the jackets 13 and 18. After the carrier material is impregnated with the molten aluminum halide, valve 17 is closed, and the pressures in the two vessels are adjusted to force the molten aluminum halide back into the vessel 10 via pipe 16. Thus, if necessary, a gas may be forced into vessel 11 via a valved connection 19, and/or gas may be allowed to escape from vessel 10 via a valved connection 20. When the level of the molten aluminum halide is below the basket in vessel 11, a cooling medium may be circulated in jacket 18 to freeze the aluminum halide in pipe 16. After the catalyst has had time to drain, the vessel 11 is cooled to below the melting point of the aluminum halide, any residual pressure is released via connection 19, and the catalyst is removed.

The process is repeated by charging a fresh quantity of carrier material, heating pipe 16 to melt the aluminum halide plug, heating vessel 11, and continuing as described above.

Another apparatus which may advantageously be employed for the preparation of large quantities of catalyst is illustrated in Figure III. The apparatus illustrated in Figure III comprises a still 30 communicating overhead and below with a catalyst chamber 31. The carrier material to be impregnated is charged into chamber 31 via a closable opening 32. The carrier material in chamber 31 rests upon a false bottom 33 and is capped by a false top 34 so adapted as to be put in place after the carrier material has been charged.

In order to impregnate the carrier material with molten aluminum halide, the lower connecting pipe 35 is cooled, for instance by passing a cooling medium through a jacket 39, and aluminum halide is distilled from still 30 until the chamber 31 is filled with liquid condensate. After the carrier material is sufficiently soaked in molten aluminum halide, pipe 35 is heated to melt the plug of aluminum halide therein, and the catalyst is allowed to drain. When the catalyst has drained sufficiently, chamber 31 is cooled to below the melting point of the aluminum halide and the catalyst removed through a manhole 38. The pressure in the system may be regulated by the addition and withdrawal of gas via a valved connection 37 situated above the catalyst bed.

In the apparatus illustrated in Figures II and III, the opening and closing of the lower pipes 16 and 35 is effected by freezing and melting the aluminum halide therein. In the handling of molten aluminum halides, this is a most advantageous device. If desired, however, suitable valves may be used.

Of the various common catalyst carriers or supports which may be combined with the aluminum halides, according to the present invention, the various siliceous and/or aluminous materials of natural or synthetic origin which may contain an appreciable amount of firmly bound or strongly adsorbed water, are preferred. While we do not desire our invention to be limited to the soundness or accuracy of any theories advanced to explain the advantageous results, it appears that the promoting action of these carrier materials is somehow connected with their firmly-bound water. Suitable materials of this category are, for example, the natural-occurring minerals and clays, such as bauxite, dawsonite, gibbsite, Florida earth, bentonite, kaolin, pipe clay, meerschaum, montmorillonite, the permutites, diatomaceous earth, kieselguhr, infusorial earth, and the like; the various treated clays and clay-like materials, such as "Tonsil," "Celite," "Sil-O-Cel," "Terrana," and the like; and artificially prepared materials such as "Activated Alumina," the artificial permutites, and the like. These materials are preferably but not necessarily, partially dehydrated by heating in a dry atmosphere at a temperature somewhat higher than that at which they are to be employed, for instance, at about 200° C. to 400° C., until they substantially cease to give off water. Of these materials and similar materials of this category "activated alumina" and the diatomaceous earths, such as "Sil-O-Cel," are found to be particularly effective. Particularly effective combination catalysts with "activated alumina" are described and claimed in copending application No. 292,295, filed August 28, 1939.

Although materials of the above class, in general, produce the most active catalysts, any of the other common catalyst carriers or supporting materials such, for instance, as crushed coke, crushed brick, charcoal, pumice, porcelain chips, majolica chips, chamotte, asbestos, and the like, may also be used, if desired. The most important advantage offered by these latter materials is their high mechanical strength and low cost.

The carrier or supporting materials which, in the present catalysts, may or may not exert a promoting action upon the catalytic activity of the aluminum halide, are preferably employed in the form of pieces, fragments, pills, macaronis, or the like, of size and shape suitable for use in catalytic reactions. Since, in the present method of preparation, the excess aluminum halide is allowed to drain from the catalyst prior to cooling below the melting point of the aluminum halide, the resulting catalyst is of the same shape, size and nearly of the same appearance as the original carrier material employed. In such cases when it is desired to employ a carrier which is too fragile or occurs naturally in too fine a state of subdivision, it may be pilled or briquetted with or without binding material into suitably shaped pieces prior to treating with the molten aluminum halide.

The present process is applicable for the preparation of catalysts using the anhydrous aluminum halides. While catalysts containing other aluminum halides may be prepared and are suitable, those prepared with aluminum chloride are by far the most useful and practical. For the preparation of aluminum chloride catalysts, any substantially anhydrous aluminum chloride, such as the powdered commercial product, may be used. For some hydrocarbon reactions, especially at elevated temperatures, it is found that catalysts prepared from aluminum chloride containing an appreciable quantity of iron chloride are much inferior. The deleterious effect of the iron may be overcome and excellent catalysts prepared from aluminum chloride contaminated with iron chloride by adding a small amount of metallic aluminum to the aluminum chloride. The amount of aluminum required depends upon the amount of iron present and is usually quite small, for example 1% or less of the metal, preferably employed in a finely divided state, usually suffices, but larger amounts may be used. It is also advantageous to employ corrosion resistant or aluminum-lined apparatus in the catalyst preparation.

The temperature at which the impregnation and subsequent draining of the catalyst takes place depends upon the particular halide employed and to some extent upon certain other factors and may vary over a considerable range. The minimum temperature is, of course, in all cases the melting point of the aluminum halide or mixture of aluminum halides employed. When preparing catalysts with aluminum chloride, for example, the temperature is always above 190° C. and below the boiling point of the aluminum chloride under the prevailing pressure, and is conveniently between about 200° C. and about 300° C.

The impregnation of the carrier material and the subsequent draining are executed under a superatmospheric pressure, preferably at least 40 lbs./in.$^2$ In the practical application of the process, excellent results may be obtained, for example, using pressures varying from about 60 to about 80 lbs./in.$^2$ Pressures of 1000 lbs./in.$^2$ or higher may, of course, be employed, but require more expensive equipment. In order to bring the pressure within the preferred range, the vapor pressure of the aluminum halide may be supplemented by a gas, such as air, $N_2$, $CO_2$, $H_2$, HCl, or the like.

In order to realize the maximum promoting action of the carrier material, (when promoting carrier materials are employed) the carrier material should be submersed in an excess of the molten aluminum halide and the excess aluminum halide allowed to drain off. This procedure, we have found, automatically produces a catalyst with a suitable aluminum halide content. The percentage of aluminum halide in the present catalysts, however, depends upon the carrier material employed, and somewhat upon the length of time allowed for impregnation, the length of time allowed for draining, the temperature during the impregnation and draining, and the viscosity of the aluminum halide melt. For example, when impregnated at about 225° C. for about two hours and thoroughly draining, catalysts prepared with the following carrier materials were found to contain the following percentages by weight of aluminum chloride.

| | Per cent (about) |
|---|---|
| "Activated alumina" | 30 |
| Sil-O-Cel (a diatomaceous earth) | 33 |
| Pumice | 40 |
| Silica gel | 23 |
| Bauxite | 39 |
| Majolica chips | 11 |

Catalysts prepared with very porous carriers and aluminum chloride at about 200° C. may contain, for example, as much as about 50% aluminum chloride.

Both the catalysts and the method of preparation of the present invention have several distinct advantages. One of the advantageous characteristics of the catalysts is their increased catalytic activity. This increased catalytic activity is very pronounced in some cases and less so in others and depends primarily upon the particular material with which the aluminum halide is combined. Since they are, in general, more effective than catalysts of the same composition prepared by conventional methods and by the method of copending application No. 290,256, filed August 15, 1939 it is apparent that the increased activity is due to a promoting effect of the carrier material which is enhanced by the present method of preparation. The more perfect utilization of the promoting effect of the various above-described mineral carrier materials is believed to be due to a more perfect saturation of all of the available surface of the carrier material with the optimum amount of fused aluminum halide. (The possibility of a small amount of chemical interaction between the molten aluminum halide and the mineral carrier material, is, of course, not excluded.) Thus, whereas in the promoted catalysts disclosed in the above-mentioned copending application, the surface of the carrier is thickly coated with aluminum chloride and sufficient excess aluminum chloride is present to bond the material, the carrier particles in the catalysts prepared according to the present invention are found to have their surfaces completely covered with a very thin film of fused aluminum halide which appears to be just sufficient to produce the most efficient catalyst.

The remarkable catalytic activity of an

"activated alumina"—aluminum chloride catalyst prepared according to the present process is illustrated in the following example:

Example I

Normal butane and isobutane were each passed separately over an "activated alumina"—aluminum chloride catalyst prepared as described in Example II and containing 30% aluminum chloride. The conditions were the same as those described in Example II. The results were as follows:

| Product | Starting with N-butane | Starting with isobutane |
| --- | --- | --- |
| Mol % isobutane | 65.3 | 65.0 |
| Mol % n-butane | 26.1 | 25.8 |
| Ratio $\frac{\text{Isobutane}}{\text{n-butane}}$ | 2.50 | 2.52 |

Example I clearly shows that even under these more or less unfavorable conditions the reaction has essentially reached equilibrium. These results are not obtained with conventional catalysts even when employing much higher temperatures and pressures.

Another advantageous characteristic of the present catalysts is their high mechanical strength. Due to the superior strength of most of the present catalysts, they can be used in larger, more economically employed beds. They also suffer much less disintegration during use and, consequently, can be used for much longer periods of time before the efficiency of the bed becomes impaired by channeling, etc. due to disintegration.

Still another important characteristic of aluminum halide catalysts prepared according to the present method is their ability to retain the aluminum chloride when employed at high temperatures. When employed at high temperatures the present soaked and drained catalysts lose very little aluminum halide by volatilization.

Although the present catalysts may be advantageously employed in any capacity wherein aluminum halide catalysts have hitherto been employed, they are exceptionally effective and advantageous in promoting hydrocarbon reactions such, in particular, as isomerization, alkylation, and polymerization. The effectiveness of the present catalysts in isomerization is illustrated, for instance, in the following examples:

Example II

Pieces of "activated alumina" of 6 to 8 mesh were soaked in an excess of molten anhydrous aluminum chloride under pressure in an apparatus similar to that illustrated in Figure I of the attached drawing. After soaking for about two hours at a temperature of about 225° C., the excess aluminum chloride was allowed to drain for about 15 minutes, the apparatus cooled, and the catalyst removed. The catalyst contained 30% aluminum chloride.

Normal butane was isomerized with the aid of this catalyst under the following conditions:

| | |
| --- | --- |
| Temperature | 100° C. |
| Pressure | 11 atmospheres. |
| Space velocity | 6 mol/liter/hr. |
| Hydrogen chloride present | 2 mol %. |

During 126 hours of continuous operation the average isobutane content of the product was 60%. Furthermore, in proportion to the amount of isomerization obtained, the amount of the side reaction products normally present was unusually small.

Example III

A catalyst prepared as above-described and containing 25.7% aluminum chloride was used for the isomerization of normal butane to isobutane under the following conditions:

| | |
| --- | --- |
| Temperature | 103–110° C. |
| Pressure | 12 atmospheres. |
| Amount of catalyst | 6.1 kgs.=5.7 liters. |
| Amount of hydrogen chloride in feed | 2.3 mol %. |
| Feed rate in kgs. N-butane/liter catalyst/hr. | 0.32. |

In 553 hours of continuous operation a total of 520 kgs. of isobutane (304 kgs. of isobutane per kg. of aluminum chloride) was produced at an average conversion of 47%. The catalyst at the end of 553 hours of operation was substantially unchanged in appearance and still active.

The present catalysts, as can be seen from the examples, not only possess outstanding activity, but retain their activity for long periods of time. When, after a long period of use, the catalytic activity finally becomes too low for economical use, the carrier may be recovered and reused, or in some cases the catalyst may be regenerated. Thus, for example, the degenerated catalyst may be treated with a suitable solvent, such as water, aqueous acid, aqueous solutions of ketones, isopropyl ether, etc. to remove the aluminum halide and impurities. The recovered carrier may then be recombined with fresh aluminum halide.

The present process for the preparation of the catalyst also has certain advantages aside from the quality of the catalysts. Thus, for example, the mixing of the aluminum halide and the carrier prior to heating, which should be done in a dry atmosphere, is entirely avoided; also, there are no fines from crushing and grading operations to be reworked.

We claim as our invention:

1. A process for the preparation of improved aluminum chloride catalysts especially suitable for catalyzing hydrocarbon reactions, which comprises the steps of soaking pieces of alumina in activated form, prepared by partial dehydration at a temperature above about 200° C. of crystalline alpha alumina trihydrate precipitated from a solution of sodium aluminate, in a substantial excess of molten anhydrous aluminum chloride over that inherently adsorbable in said alumina, said soaking being effected under pressure, draining off excess molten aluminum chloride in an atmosphere containing aluminum chloride vapors under pressure, and cooling to below 190° C.

2. A process for the preparation of improved aluminum chloride catalysts especially suitable for catalyzing hydrocarbon reactions, which comprises the steps of soaking pieces of alumina containing firmly bound water and prepared by partial dehydration at a temperature above about 200° C., said soaking being effected under pressure in a substantial excess of molten anhydrous aluminum chloride over that inherently adsorbable in said alumina, draining off excess molten aluminum chloride in an atmosphere containing aluminum chloride vapors under pressure, and cooling to below 190° C.

3. A process for the preparation of improved aluminum chloride catalysts especially suitable for catalyzing hydrocarbon reactions, which comprises the steps of soaking pieces of diatomaceous earth containing firmly bound water and prepared by partial dehydration at a temperature above about 200° C., said soaking being effected under pressure in a substantial excess of molten anhydrous aluminum chloride over that inherently adsorbable in said diatomaceous earth, draining off excess molten aluminum chloride in an atmosphere containing aluminum chloride vapors under pressure, and cooling to below 190° C.

4. A process for the preparation of improved aluminum chloride catalysts especially suitable for catalyzing hydrocarbon reactions, which comprises the steps of soaking pieces of a mineral catalyst carrier containing firmly bound water and prepared by partial dehydration at a temperature above about 200° C., said soaking being effected under a pressure greater than 40 pounds per square inch in a substantial excess of molten anhydrous aluminum chloride over that inherently adsorbable in said carrier, draining off excess molten aluminum chloride in an atmosphere containing aluminum chloride vapors under pressure, and cooling to below 190° C.

SAMUEL BENSON THOMAS.
FRANK MATTHEW McMILLAN.